United States Patent [19]
Kass

[11] Patent Number: 5,389,934
[45] Date of Patent: Feb. 14, 1995

[54] PORTABLE LOCATING SYSTEM

[75] Inventor: Sheldon Kass, North Brunswick, N.J.

[73] Assignee: The Business Edge Group, Inc., North Brunswick, N.J.

[21] Appl. No.: 78,637

[22] Filed: Jun. 21, 1993

[51] Int. Cl.⁶ .................................... H04B 7/185
[52] U.S. Cl. .................................... 342/357
[58] Field of Search ........................ 342/357

[56] References Cited

U.S. PATENT DOCUMENTS 4,547,778  10/1985  Hinkle et al. .................. 342/456
4,833,477   5/1989  Tendler ........................... 342/389
5,043,736   8/1991  Darnell et al. .................. 342/357

*Primary Examiner*—Mark Hellner
*Attorney, Agent, or Firm*—Ezra Sutton

[57] ABSTRACT

A portable tracking system that includes one or more portable units for determining their respective locations and communicating it to another unit or to a remote telephone unit. Each unit includes a global positioning system GPS for determining latitude and longitude, a micro-computer, a cellular telephone, and a digital data to voice for converter and batteries.

7 Claims, 2 Drawing Sheets

# PORTABLE LOCATING SYSTEM

FIELD OF THE INVENTION

The present invention relates to a portable locating system, which includes a global positioning unit, cellular telephone equipment, and a data-to-voice converter, all powered by rechargeable batteries and solar cells.

BACKGROUND OF THE INVENTION

Although positioning systems and tracking systems are known, they do not include communications equipment for communicating with a remote unit by voice.

Accordingly, it is an object of the present invention to provide a portable locating system powered by solar cells and including telephone equipment and a data-to-voice converter.

SUMMARY OF THE INVENTION

In accordance with the principles of the present invention, there is provided a portable tracking system including a global positioning system (GPS) for intermittently determining the latitude and longitude of the system as it changes location, in response to being activated or triggered by a phone call, a memory unit for storing location information supplied by the global positioning system, a clock for supplying time and date information to the system, a micro-computer for controlling the operation of the system, cellular telephone equipment for communicating with a remote telephone unit via a telephone network, means for converting digital data to voice for responding to a telephone call from the remote telephone unit to provide location information, including latitude and longitude, solar cells for charging batteries that supply power to the system, and the entire system being portable so as to be carried by a person or vehicle to be located.

BRIEF DESCRIPTION OF THE DRAWINGS

Further objects, features, and advantages of the present invention will become apparent upon consideration of the detailed description of the presently-preferred embodiment, when taken in conjunction with the accompanying drawings wherein.

DESCRIPTION OF THE PREFERRED EMBODIMENT

Figure 1:
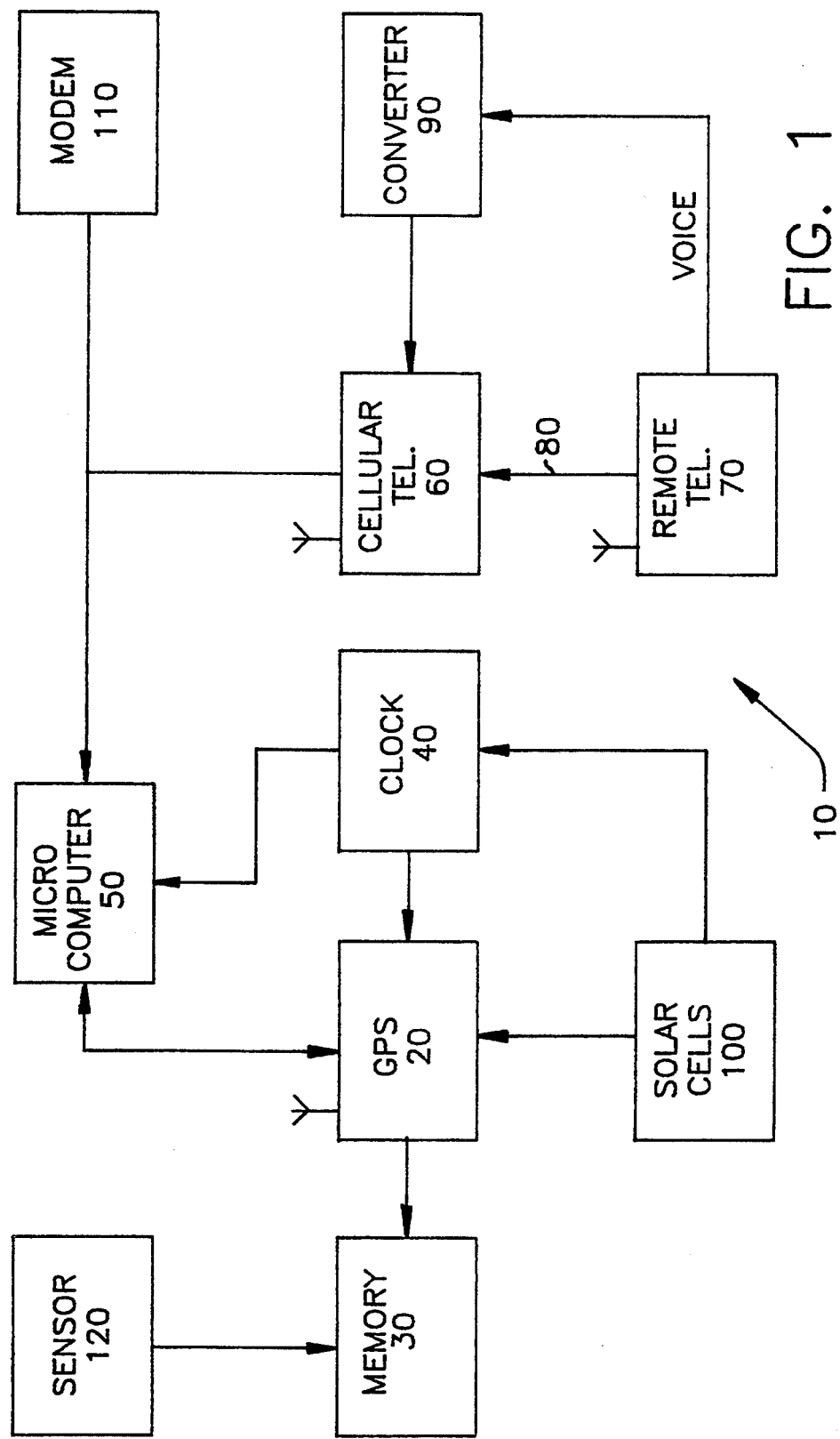
FIG. 1 shows a block diagram of the system of the present invention.

FIG. 1 discloses a portable tracking system 10 which includes a global positioning system (GPS) 20 for intermittently determining, when activated or triggered, the latitude and longitude of the system as it changes location. A suitable unit is a Magellan NAV 5000, as it is portable, compact, and hand held. A memory unit 30 is provided for storing location information supplied by GPS unit 20, and it may record the history of travel of GPS 20. Further, memory unit 30 may contain street address information corresponding to the latitude and longitude information.

A clock 40 is provided for supplying time and date information to the system. A micro-computer 50 is provided for controlling the operation of the system, such as an IBM or Casio computer. Cellular telephone equipment 60 is provided for communicating with a remote telephone unit 70 via a telephone network 80. A converter 90 is provided for converting digital data to voice for responding to a telephone call from the remote telephone unit 70 to provide location information, including latitude and longitude. Solar cells and rechargeable batteries 100 are provided for supplying power to the system 10. Modem 110 is provided for transmitting and receiving data via the telephone network 80. In certain applications, a sensor 120 is provided for sensing and storing temperature information of a vehicle in the memory unit.

System 10 is a portable device that is carried by either a person or a vehicle. System 10 has the ability to sense its location (latitude and longitude), answer a telephone call (cellular), which triggers GPS unit 20 to determine its latitude and longitude, and respond to the telephone call via voice transmission with the location information. It is powered by rechargeable batteries which are recharged by the solar cells. System 10 operates in the following manner. System 10 is given to the person/vehicle that is to be located. The person doing the locating uses a normal or cellular remote telephone unit 70 to call cellular telephone 60, which activates GPS unit 20 to determine its latitude and longitude, and system 10 answers the call and responds with a voice message stating its current location (latitude and longitude). Converter 90 converts the digital location data from GPS unit 20 to a voice message for responding to the telephone call to provide the location information. In addition, system 10 is normally inactive and utilizes little power, until it is activated by the telephone call. When this occurs, GPS unit 20 provides the longitude and latitude information, and then it returns to its inactive mode, in which minimal power is used.

Figure 2:
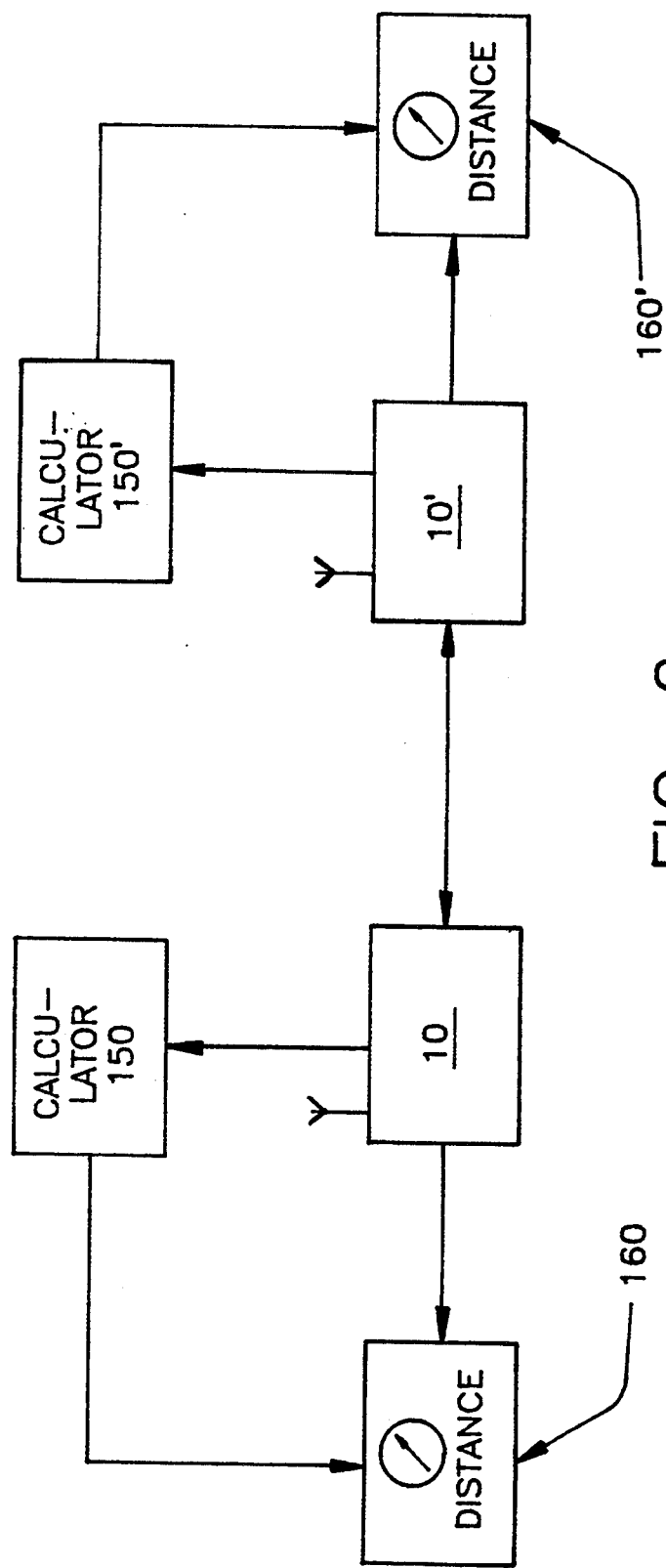
FIG. 2 shows a modified form of the invention.

In another embodiment, shown in FIG. 2, two systems, designated 10 and 10', communicate with each other to track each other's location as their respective positions change. Each unit 10 and 10' is the same as shown in FIG. 1, and they communicate with each other via the cellular telephone equipment 60 and modem 110 to transmit their respective positions to each other as both units 10 and 10' travel and change location.

Each unit 10 and 10' determines its location in terms of latitude and longitude, and this information of the coordinates from both units is supplied to an internal electronic calculator 150 and 150' to determine a vector of the distance between the units and the direction of one unit relative to the other, relative to a reference point, such as "North." The data are combined with a compass reading of "North" to display visually on a screen 160 and 160' in each unit 10 and 10' an arrow pointing to the other unit, as well as providing a visual readout on each unit of the distance between units 10 and 10' in appropriate units.

In operation, if a person is carrying unit 10, that person can use the telephone on his unit to dial and call unit 10' to determine the location (latitude and longitude) of unit 10', its distance from unit 10, and its direction relative to unit 10. Thus, the 2 units may continuously interact with each other and track each other in a simple and portable manner.

The present invention has application in automobile/truck recovery, child kidnapping/missing, prisoner release/parole, armed car services, military, and insurance-shipment of high-value equipment.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. A portable tracking system, comprising:
   a) at least first and second portable tracking units for communicating with each other to monitor and track each other as they each change location, said first and second portable tracking units each including an electronic calculator for converting latitude and longitude information to the distance and direction between said first and second units, and each of said first and second units including a visual display for displaying an arrow pointing in the direction of the other unit, and for displaying the distance between said first and second units;
   b) a global positioning system for determining the latitude and longitude of said system as it changes location in response to a telephone call from a remote telephone unit in said second portable tracking unit;
   c) a memory unit for storing location information in digital data form supplied by said global positioning system;
   d) a clock for supplying time and date information to said system;
   e) a micro-computer for controlling the operation of said system;
   f) cellular telephone equipment for communicating with said remote telephone unit via a telephone network for transmitting said location information in voice form and for triggering said global positioning system;
   g) means for converting digital data from said global positioning system to voice form for responding via said cellular telephone equipment to a telephone call from said remote telephone unit to provide location information, including latitude and longitude, in voice form to the person calling on said remote telephone unit;
   h) batteries for supplying power to said system; and
   i) said entire system being portable so as to be carried by a person or vehicle to be located.

2. A portable tracking system in accordance with claim 1, wherein said memory unit receives information from said GPS system to record the history of travel of said system.

3. A portable tracking system in accordance with claim 1, further including a memory unit containing address information corresponding to said latitude and longitude information.

4. A portable tracking system in accordance with claim 1, further including a computer modem for transmitting and receiving data via a telephone network.

5. A portable tracking system in accordance with claim 1, further including means for sensing and storing temperature information of the vehicle in a memory unit.

6. A portable tracking system, comprising:
   a) at least first and second portable tracking units for communicating with each other to monitor and track each other as they each change location, at least one of said first and second portable tracking units including an electronic calculator for converting latitude and longitude information to the distance and direction between said first and second units, and at least one of said first and second units including a visual display for displaying an arrow pointing in the direction of the other unit, and for displaying the distance between said first and second units;
   b) a global positioning system for determining the latitude and longitude of said system as it changes location in response to a telephone call from a remote telephone unit in said second portable tracking unit;
   c) a memory unit for storing location information in digital data form supplied by said global positioning system;
   d) a clock for supplying time and date information to said system;
   e) a micro-computer for controlling the operation of said system;
   f) cellular telephone equipment for communicating with said remote telephone unit via a telephone network for transmitting said location information in voice form and for triggering said global positioning system;
   g) means for converting digital data from said global positioning system to voice form for responding via said cellular telephone equipment to a telephone call from said remote telephone unit to provide location information, including latitude and longitude, in voice form to the person calling on said remote telephone unit;
   h) batteries for supplying power to said system; and
   i) said entire system being portable so as to be carried by a person or vehicle to be located.

7. A portable tracking system in accordance with claim 6, further including a memory unit for storing location information supplied by said global positioning system.

* * * * *